(12) United States Patent
Lagsdin

(10) Patent No.: US 9,648,974 B1
(45) Date of Patent: May 16, 2017

(54) BAKING SHEET

(71) Applicant: Andris Lagsdin, Cohasset, MA (US)

(72) Inventor: Andris Lagsdin, Cohasset, MA (US)

( * ) Notice: Subject to any disclaimer, the term of this patent is extended or adjusted under 35 U.S.C. 154(b) by 16 days.

(21) Appl. No.: 13/746,848

(22) Filed: Jan. 22, 2013

(51) Int. Cl.
*A47J 27/00* (2006.01)
(52) U.S. Cl.
CPC .................... *A47J 27/00* (2013.01)
(58) Field of Classification Search
CPC  A47J 36/02; A47J 37/10; A47J 27/002; A47J 27/10; A47J 27/00; A21B 3/13
USPC ........... 220/573.1, 573.2, 507, 555; 206/503, 206/558, 564; 126/390.1; D7/586, D7/554.3, 409, 390, 363, 359, 354
See application file for complete search history.

(56) References Cited

U.S. PATENT DOCUMENTS

| | | | | |
|---|---|---|---|---|
| 1,204,429 A | * | 11/1916 | Griswold | A47J 37/10 99/425 |
| 3,080,996 A | * | 3/1963 | Graham | A47J 45/062 220/318 |
| 7,765,919 B2 | | 8/2010 | Siegel et al. | |
| D665,225 S | * | 8/2012 | Zakula | A47J 45/062 D7/409 |
| D700,003 S | * | 2/2014 | Lagsdin | A21B 3/00 D7/354 |
| D732,876 S | * | 6/2015 | Lagsdin | A21B 3/00 D7/354 |

* cited by examiner

Primary Examiner — Fenn Mathew
Assistant Examiner — Cynthia Collado
(74) Attorney, Agent, or Firm — David M. Driscoll, Esq.

(57) ABSTRACT

A baking sheet formed of a metal planar plate member having a polygon shape defined by multiple sides, having a thickness and periphery, having upper and lower planar surfaces, having a cross-sectional dimension that is an order of magnitude greater than the thickness of the metal planar plate member, a peripheral channel that extends about the periphery of the metal planar plate member, and the peripheral channel being disposed closely adjacent to all sides of the metal planar plate member.

12 Claims, 4 Drawing Sheets

BAKING SHEET

FIELD OF THE INVENTION

The present invention relates in general to a baking sheet and pertains, more particularly, to a baking sheet that can be used for a variety of different food products and that is, in particular, adapted for use in an oven.

BACKGROUND OF THE INVENTION

There are a variety of different ways that food products can be cooked. For example, with regard to a food such as pizza, it is typically cooked in an oven. The purpose of the present invention is to provide a simplified cooking surface that is in the form of a baking sheet that is preferably constructed of steel.

SUMMARY OF THE INVENTION

In accordance with the present invention there is provided a baking sheet formed of a metal planar plate member having a polygon shape defined by multiple sides, having a thickness and periphery, having upper and lower planar surfaces, having a cross-sectional dimension that is an order of magnitude greater than the thickness of the metal planar plate member, and a peripheral channel that extends about the periphery of the metal planar plate member, the peripheral channel being disposed closely adjacent to all sides of the metal planar plate member.

In accordance with other aspects of the present invention the metal planar plate member is substantially square; the metal planar plate member is constructed of steel; the channel is semi-circular in cross-section and extends around the entire metal planar plate member; alternatively the channel is substantially square; the depth of the channel is on the order of 15% to 50% of the thickness of the metal planar plate member; the thickness of the metal planar plate member is in a range of 3/16 to 1 inch; the thickness is in a range on the order of 1/4 inch to 3/4 inch; each side is joined at a rounded corner; the rounded corner has a radius on the order of 1.5 inch; the channel includes straight respective sections adjacent to the sides and arcuate sections adjacent each corner; the channel is semi-circular in cross-section; an outer edge of the channel is disposed spaced about the same distance from a side as the width of the channel; the channel has a width in a range on the order of 0.025 to 0.075 inch; the distance from the outer edge of the channel to a side is in a range on the order of 0.025 to 0.075 inch; the metal planar plate member has side dimensions of 14 inches by 16 inches; the metal planar plate member has the channel on the upper planar surface; the metal planar plate member has the channel on both the upper and lower planar surfaces; the depth of the channel is less than one half the thickness of the metal planar plate member, and the upper surface tapers outwardly and downwardly from a center point on the upper surface; and the depth of the channel is on the order of 15% to 50% of the thickness of the metal planar plate member; wherein the thickness of the metal planar plate member is in a range of 3/16 to 1 inch; wherein each side is joined at a rounded corner; wherein the channel includes straight respective sections adjacent to the sides and arcuate sections adjacent each corner; wherein the channel is semi-circular in cross-section and extends around the entire metal planar plate member; wherein the channel has a width in a range on the order of 0.025 to 0.075 inch; and wherein upper and lower surfaces of the metal planar plate member are on of smooth and grooved.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 1:
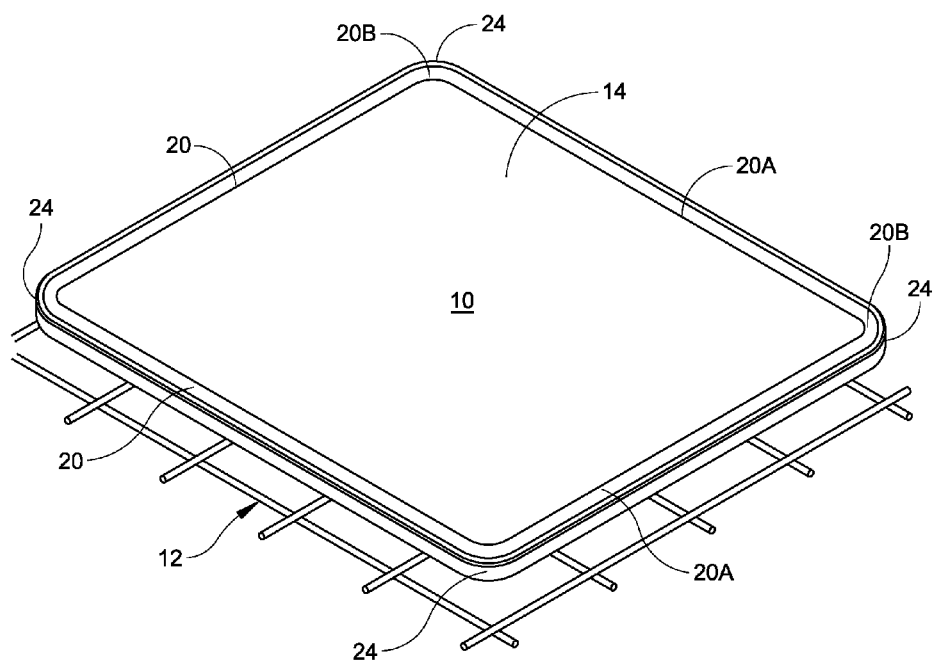
FIG. 1 is a perspective view illustrating the baking sheet of the present invention as would be positioned in an oven on an oven grate.
Figure 2:
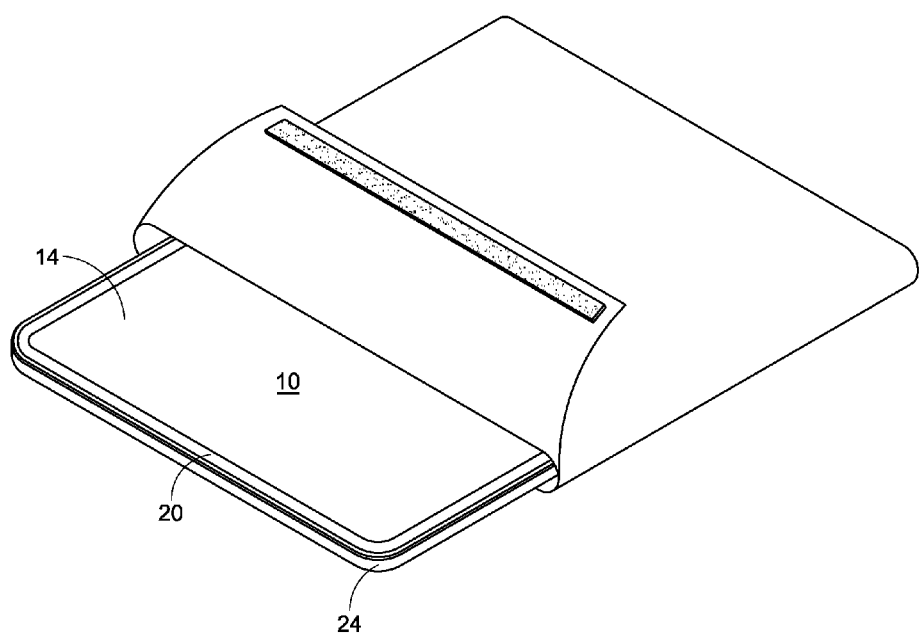
FIG. 2 is a perspective view showing the baking sheet of the present invention as partially supported in a case.
Figure 5:
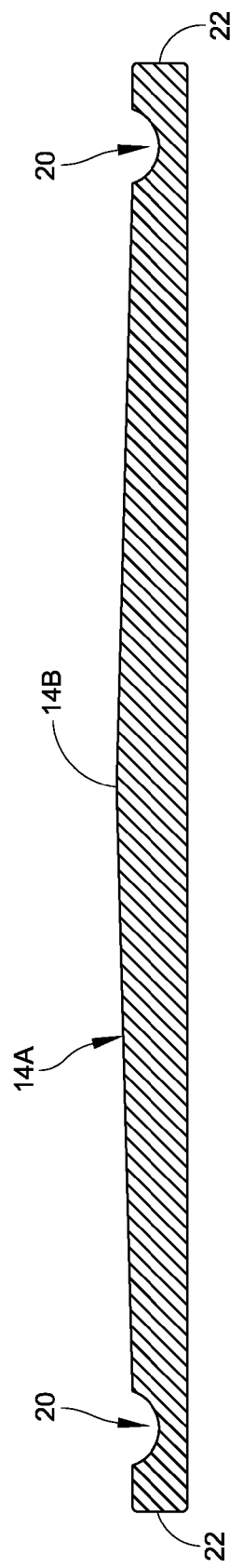
FIG. 5 is a cross-sectional view of an alternate embodiment of the present invention in which the top surface is partially tapered.
Figure 6:
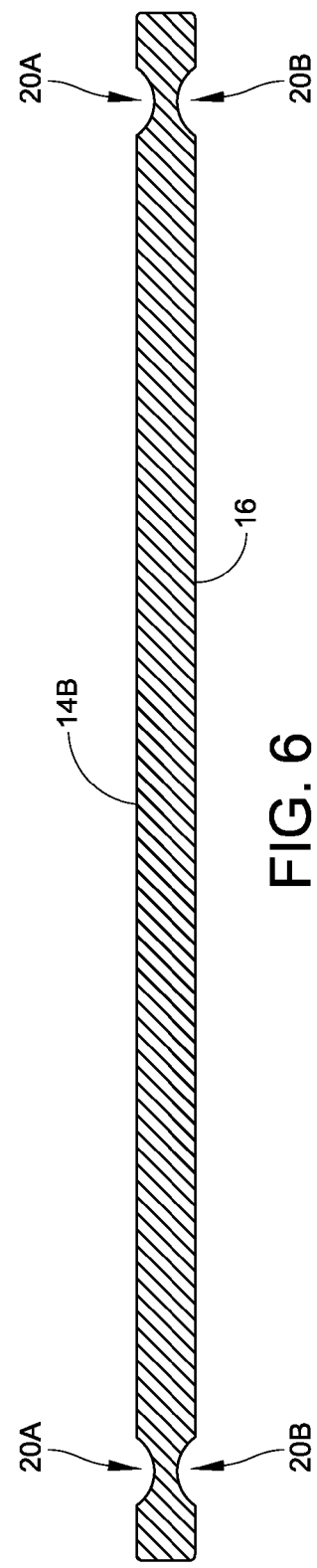
FIG. 6 is a cross-sectional view of still another embodiment of the present invention employing grooves on upper and lower surfaces.

Reference is now made to the drawings and, in particular, to FIGS. 1-4. FIGS. 5 and 6 are cross-sectional views showing alternate embodiments of the invention. In FIG. 1 there is illustrated a perspective view showing the baking sheet 10 as it would be positioned on a grate 12 such as a grate found in an oven. The baking sheet 10 is preferably constructed of a metal material and in one embodiment of the present invention is either square or rectangular. For example, in one embodiment the baking sheet may have dimensions of 14 inches by 16 inches.

Thus, there is disclosed in the drawings a metal planar plate member 10 having a polygon shape defined by multiple sides and in the preferred embodiment defined by four sides. This sheet is constructed of a solid metal material, preferably steel and has a thickness that may be in a range of 3/16 to 1 inch. More particularly, the thickness may be in a range on the order of 1/4 to 3/4 inch.

The baking sheet that is illustrated in the drawings has an upper surface 14 and a lower surface 16. In the first embodiment of the present invention, the lower surface 16 may be completely planar and have a relatively smooth surface. The baking sheet 10 may have a cross-sectional dimension that is an order of magnitude greater than the thickness of the metal planar plate member.

Figure 3:
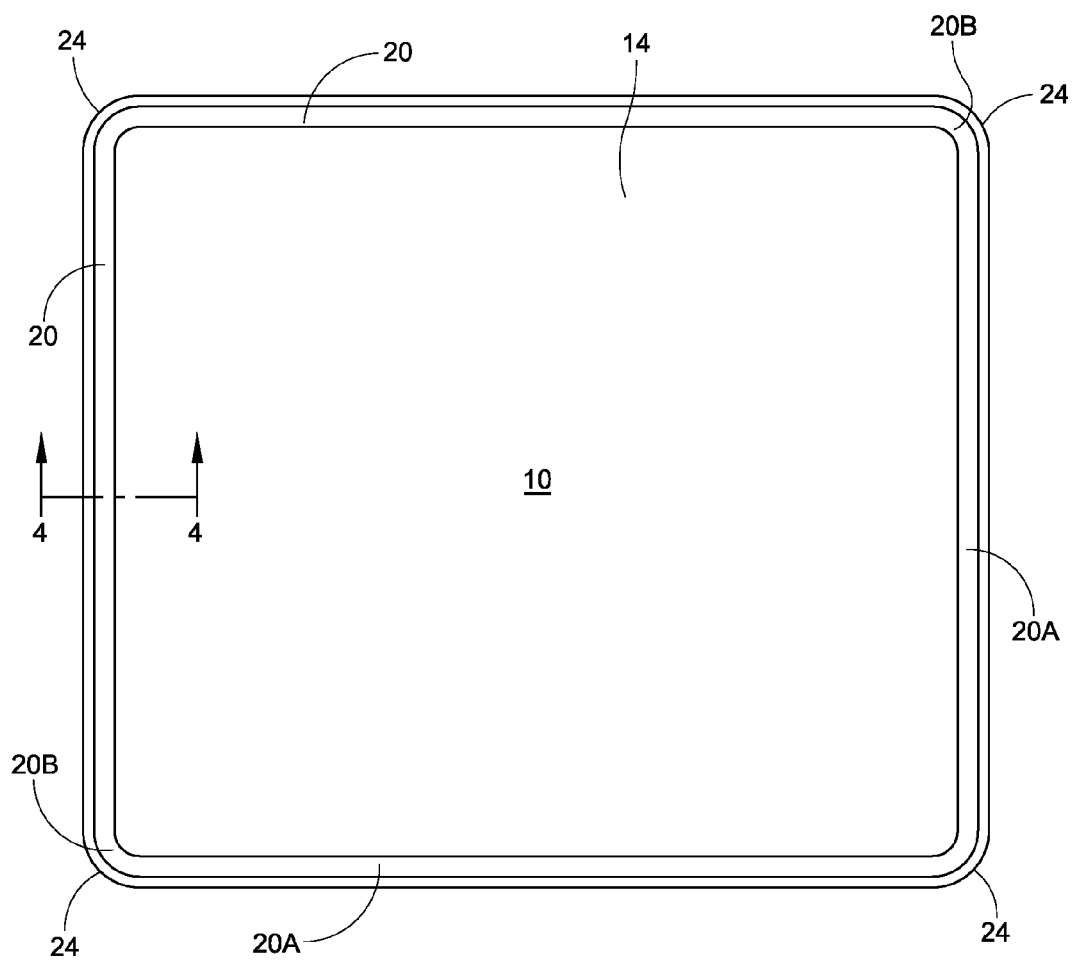
FIG. 3 is a plan view of the baking sheet of the present invention.
Figure 4:
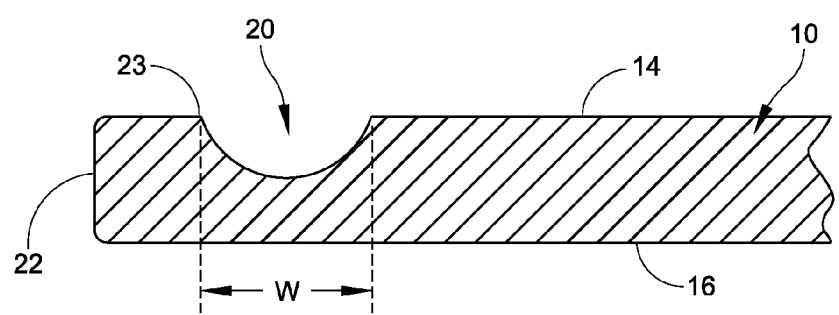
FIG. 4 is a cross-sectional view taken along line 4-4 of FIG. 3.

There is disposed about the periphery of the planar plate member 10 a peripheral channel 20 that is illustrated by the fragmentary cross-sectional view of FIG. 4. In the illustrated embodiment the channel 20 is shown as semi-circular in shape, although, it may also have other cross-sectional configurations such as square, rectangular or trapezoidal. As illustrated in FIGS. 1 and 3, the groove 20 is a continuous groove that extends about the entire periphery of the baking sheet 10. This peripheral channel 20 is disposed closely adjacent at all sides of the metal planar plate member 10.

The cross-sectional view of FIG. 4 illustrates the close proximity of the channel 20 to an outer side edge 22 of the metal planar plate member.

The depth of the channel 20, such as illustrated in FIG. 4, may be on the order of 15 percent to 50 percent of the overall thickness of the plate member. In FIG. 4, the depth of the channel is shown as approximately 40 percent of the thickness of the plate member. Another characteristic of the plate member is that the corners are rounded as at 24. The corners may have a radius on the order of an inch and a half. Thus, the channel or groove 20 may be considered as having respective straight sections 20A and arcuate sections 20B at each corner 24. Another characteristic of the channel 20, again, as illustrated in FIG. 4, is that the outer edge of the channel at 23 is disposed spaced about the same distance from a side 22 as the width of the channel itself indicated in FIG. 4 by the dimension W. The channel 20 has a width and a range on the order of 0.025 to 0.075 inch. Thus, the distance from the outer edge 23 of the channel to the side 22 may also be in a range on the order of 0.025 to 0.075 inch.

Reference is now made to alternate embodiments illustrated in the cross-sectional views of FIGS. 5 and 6. In FIG. 5, there is also a peripheral channel or groove 20 that may be disposed in substantially the same position as illustrated in FIGS. 1-4. FIG. 5 differs from the earlier embodiment in FIGS. 1-4 in that the upper surface 14A, instead of being completely flat and planar, tapers to a center point at 14B. In a sense, this surface 14A is conical but with a very minor taper.

The groove 20 that is illustrated herein is used for the purpose of accumulating any grease from the food product that is being placed upon the top of the plate member. By providing a tapered surface 14A, this means that any grease or other byproducts from a food product would flow down into the groove or channel 20.

The cross-sectional view of FIG. 6 illustrates still another embodiment of the present invention in which there is a peripheral channel on both the upper surface 14 as well as the lower surface 16. These are represented in FIG. 6 by the respective channels 20A and 20B. Each of these channels 20A and 20B may be a continuous channel that extends about the entire periphery of the respective upper and lower planar surfaces of the metal planar plate member 10.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A baking sheet formed of a metal planar plate member having a polygon shape defined by multiple sides, having a thickness and periphery, having upper and lower planar surfaces, having a side-to-side dimension that is at least an order of magnitude greater than the thickness of the metal planar plate member, a peripheral channel that extends about the periphery of the metal planar plate member, the peripheral channel being disposed closely adjacent to all sides of the metal planar plate member,
   wherein the metal planar plate member has four straight sided, in combination with a grate member on which the metal planar plate member is positioned in an oven,
   wherein the metal planar plate member is a solid structure bounded by upper and lower planar surfaces that respectively define the upper and lower planar surfaces of the metal planar plate member,
   wherein the upper and lower planar surfaces of the metal planar plate member are disposed in parallel with each other,
   wherein the upper and lower bounded planar surfaces of the metal planar plate member are of the same surface area size,
   wherein the lower bounded surface of the metal planar plate member is the lowermost rest surface of the metal planar plate member for positioning on the grate member,
   wherein the grate member is constructed and arranged to extend beyond the sides of the metal planar plate member,
   wherein each side of the metal planar plate member is joined at a contiguous corner,
   wherein the metal planar plate member is constructed of steel,
   wherein each side of the metal planar plate member is formed by a flat sidewall surface that extends about the entire periphery of the solid structure and that extends orthogonal to both the upper and lower bounded surfaces of the metal planar plate member,
   wherein the metal planar plate member has the channel on the upper planar surface thereof,
   wherein the channel is semi-circular in cross-section and is maintained as semi-circular extending about the entire metal planar plate member,
   wherein the channel includes straight respective semi-circular channel sections adjacent to the sides and extending as a semi-circular channel along the entire length of each straight section, and smaller respective semi-circular channel sections adjacent each corner and extending as a semi-circular channel about a circumference of each smaller section,
   wherein the semi-circular channel has only a semi-circular surface with opposed top ends of the channel terminating at the upper planar surface of the metal planar plate member and at respective inner and outer locations of the upper planar surface of the metal planar plate member,
   wherein both the straight and smaller semi-circular channel sections have respective semi-circular cross-section surfaces,
   wherein each of the smaller semi-circular cross-section surfaces are contiguous with adjacent straight semi-circular cross-section surfaces,
   and wherein each of the smaller semi-circular cross-section surfaces are disposed in an arc at the plate member corner in joining the adjacent straight semi-circular cross-section surfaces.

2. The baking sheet of claim 1 wherein the depth of the channel is on the order of 15% to 50% of the thickness of the metal planar plate member.

3. The baking sheet of claim 1 wherein the thickness of the metal planar plate member is in a range of ³⁄₁₆ to 1 inch.

4. The baking sheet of claim 1 wherein the thickness of the metal planar plate member is in a range on the order of ¼ half inch to ¾ inch.

5. The baking sheet of claim 1 wherein the channel has a width in a range on the order of 0.025 to 0.075 inch.

6. The baking sheet of claim 1 wherein the distance from the outer edge of the channel to a side is in a range on the order of 0.025 to 0.075 inch.

7. The baking sheet of claim 1 wherein the metal planar plate member has side dimensions of 14 inches by 16 inches.

8. The baking sheet of claim 1 wherein the metal planar plate member has the channel on both the upper and lower planar surfaces.

9. The baking sheet of claim 1 wherein the depth of the channel is on the order of 15% to 50% of the thickness of the metal planar plate member; wherein the thickness of the metal planar plate member is in a range of 3/16 to 1 inch; wherein each side is joined at a rounded corner; wherein the channel has a width in a range on the order of 0.025 to 0.075 inch; and wherein upper and lower surfaces of the metal planar plate member are one of smooth and grooved.

10. The baking sheet of claim 1 wherein the metal planar plate member has rounded corners.

11. The baking sheet of claim 10 wherein the rounded corner has a radius on the order of 1.5 inch.

12. The baking sheet of claim 10 wherein the upper surface of the metal planar plate member tapers outwardly and downwardly from a center point on the upper surface.

\* \* \* \* \*